United States Patent
Oki et al.

(10) Patent No.: US 11,256,160 B2
(45) Date of Patent: Feb. 22, 2022

(54) EYECUP MOUNTING MECHANISM AND OPTICAL APPARATUS INCLUDING EYECUP MOUNTING MECHANISM

(71) Applicant: Panasonic Intellectual Property Management Co., Ltd., Osaka (JP)

(72) Inventors: Akihiro Oki, Osaka (JP); Takuya Amano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 180 days.

(21) Appl. No.: 16/624,788

(22) PCT Filed: May 16, 2019

(86) PCT No.: PCT/JP2019/019535
§ 371 (c)(1),
(2) Date: Dec. 19, 2019

(87) PCT Pub. No.: WO2020/100327
PCT Pub. Date: May 22, 2020

(65) Prior Publication Data
US 2021/0333687 A1 Oct. 28, 2021

(30) Foreign Application Priority Data
Nov. 14, 2018 (JP) .............................. JP2018-213982

(51) Int. Cl.
*G03B 11/04* (2021.01)
(52) U.S. Cl.
CPC ................... *G03B 11/046* (2013.01)
(58) Field of Classification Search
CPC .............................. G03B 11/046; G03B 11/04
(Continued)

(56) References Cited

U.S. PATENT DOCUMENTS

2010/0111518 A1* 5/2010 Schmidt ............... G03B 11/046
396/534

FOREIGN PATENT DOCUMENTS

| JP | S63-35028 | 3/1988 |
| JP | 04-51126 A | 2/1992 |

(Continued)

OTHER PUBLICATIONS

International Preliminary Report on Patentability for Corresponding Application No. PCT/JP2019/019535 dated May 27, 2021, English Translation.

(Continued)

*Primary Examiner* — Christopher E Mahoney
(74) *Attorney, Agent, or Firm* — Renner, Otto, Boisselle & Sklar, LLP

(57) ABSTRACT

An eyecup of an eyecup mounting mechanism includes an eye rubber, a fixing member that holds the eye rubber in a predetermined position, a movable member held movably by the fixing member, and an elastic member that presses the movable member against the fixing member to fix the movable member to the fixing member, and wherein a mounting member provided in the camera body is fitted between the fixing member and the movable member against a pressing force of the elastic member, and the mounting member is sandwiched by the fixing member and the movable member, for the purpose of providing a highly reliable eyecup mounting mechanism and an optical apparatus including the eyecup mounting mechanism.

11 Claims, 10 Drawing Sheets

(58) Field of Classification Search
USPC .......................... 359/611; 396/373, 534–535
See application file for complete search history.

(56) References Cited

FOREIGN PATENT DOCUMENTS

| | | |
|---|---|---|
| JP | 11-109442 A | 4/1999 |
| JP | 2005-17401 A | 1/2005 |

OTHER PUBLICATIONS

International Search Report for corresponding Application No. PCT/JP2019/019535, dated Aug. 6, 2019.
Extended European Search Report for corresponding European Application No. 19813711.9 dated Dec. 22, 2021.

* cited by examiner

Fig.2A
Fig.2B
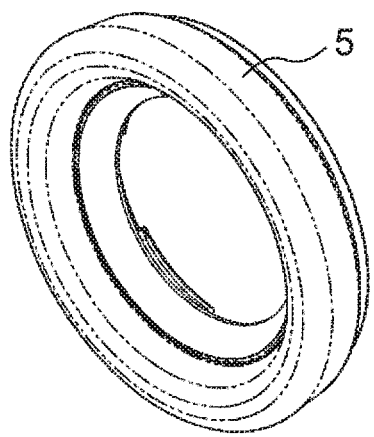
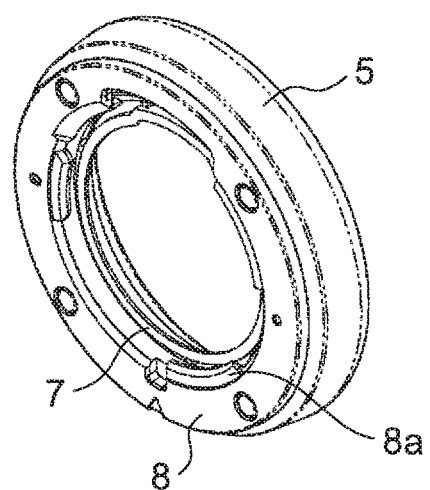

EYECUP MOUNTING MECHANISM AND OPTICAL APPARATUS INCLUDING EYECUP MOUNTING MECHANISM

TECHNICAL FIELD

The present invention relates to an eyecup mounting mechanism that is removably provided on an eyepiece portion of an optical apparatus and blocks external light such as sunlight, and an optical apparatus including the eyecup mounting mechanism.

BACKGROUND ART

An eyecup is provided in an eyepiece portion of a viewfinder of an optical apparatus, for example, a camera. In particular, in high-end models, a removable configuration is provided so that dirt on the eyecup provided on the eyepiece portion can be easily removed, and the eyecup can be replaced according to the shooting purpose and shooting scene.

CITATION LIST

Patent Literatures

PLT1: JP 11-109442 A
PLT2: JP 2005-17401 A
PLT3: JP 04-51126 A

SUMMARY OF INVENTION

Technical Problem

It is important that the eyecup mounted to the optical apparatus is easy to install, and has a securely mounted structure, and the operational feeling during the mounting operation of the eyecup and the mounting feeling in the mounted state are important factors, for example, in high-end models of the camera and the like. In the field of the optical apparatus, since the apparatus is a precision machine, there is a need for a highly reliable optical apparatus that has a smooth movement when the eyecup is mounted, has a secure mounting feeling without rattling in the mounted state, and thereby, can constantly maintain a high-quality mounting state.

An object of the present invention is to provide a highly reliable eyecup mounting mechanism that is easy to mount on an optical apparatus, has the smooth mounting operation, and can reliably maintain a high-quality mounted state, and an optical apparatus including the eyecup mounting mechanism.

Solution to Problem

An eyecup mounting mechanism according to an aspect of the present invention includes the eyecup mounting mechanism for mounting a removable eyecup to a camera body, wherein the eyecup includes an eye rubber, a fixing member that holds the eye rubber in a predetermined position, a movable member held movably by the fixing member, an elastic member that presses the movable member against the fixing member to fix the movable member to the fixing member, and wherein a mounting member provided in the camera body is fitted between the fixing member and the movable member against a pressing force of the elastic member, and the mounting member is sandwiched by the fixing member and the movable member.

An optical apparatus according to an aspect of the present invention includes the optical apparatus including an eyecup mounting mechanism for mounting a removable eyecup to a camera body, wherein the eyecup includes an eye rubber, a fixing member that holds the eye rubber in a predetermined position, a movable member held movably by the fixing member, an elastic member that presses the movable member against the fixing member to fix the movable member to the fixing member, and wherein a mounting member provided in the camera body is fitted between the fixing member and the movable member against a pressing force of the elastic member, and the mounting member is sandwiched by the fixing member and the movable member.

Advantageous Effects of Invention

According to the present invention, a highly reliable eyecup mounting mechanism that is easy to mount on an optical apparatus, has the smooth mounting operation, and can reliably maintain a high-quality mounted state, and an optical apparatus including the eyecup mounting mechanism can be provided.

BRIEF DESCRIPTION OF DRAWINGS

FIGS. 2A and 2B each are a perspective view showing an eyecup of the first embodiment (FIG. 2A is an eyepiece side of the eyecup, and FIG. 2B is a lens side of the eyecup).

DESCRIPTION OF EMBODIMENTS

Figure 1:
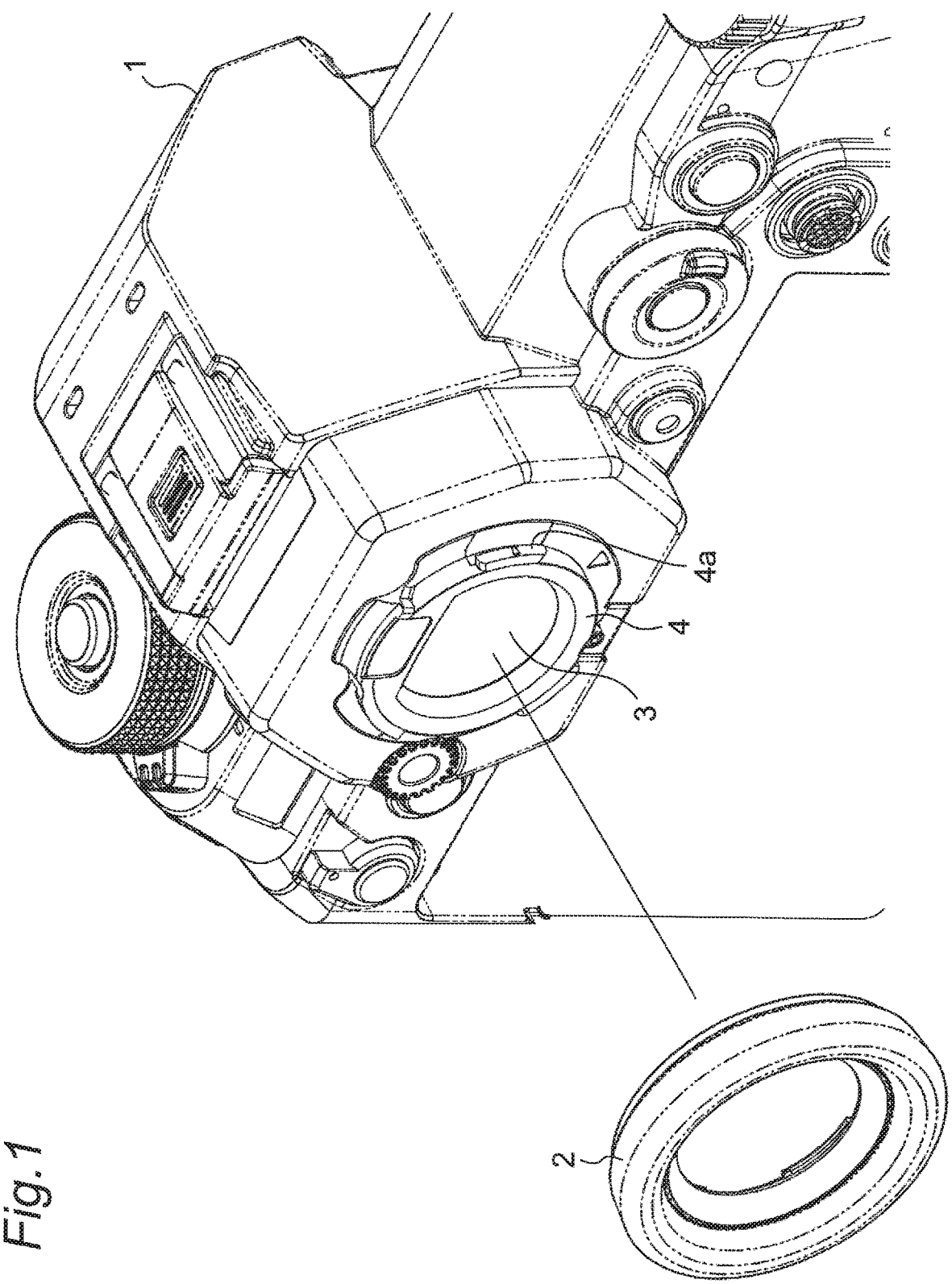
FIG. 1 is a perspective view showing the vicinity of a viewfinder in a camera that is an optical apparatus of a first embodiment according to the present invention.

Hereinafter, a camera will be described with reference to the accompanying drawings as an embodiment of an optical apparatus including the eyecup mounting mechanism of the present invention. The optical apparatus of the present invention is not limited to the configuration of the camera described in the following embodiments, but can be applied to various optical apparatuses having an eyecup mounting mechanism.

Further, numerical values, shapes, configurations, steps, order of steps, and the like shown in the following embodiments are merely examples and do not limit the present invention. Among the components in the following embodiments, components that are not described in the independent claim indicating the highest concept are described as optional components. In each embodiment, the same reference numeral may be attached to the same element and the description may be omitted. Also, the drawings schematically show the respective components mainly for the purpose of easy understanding.

First, various aspects of the eyecup mounting mechanism and the optical apparatus of the present invention will be exemplified.

An eyecup mounting mechanism according to a first aspect of the present invention includes the eyecup mounting mechanism for mounting a removable eyecup to a camera body, wherein the eyecup includes an eye rubber, a fixing member that holds the eye rubber in a predetermined position, a movable member held movably by the fixing member, an elastic member that presses the movable member against the fixing member to fix the movable member to the fixing member, and wherein a mounting member provided in the camera body is fitted between the fixing member and the movable member against a pressing force of the elastic member, and the mounting member is sandwiched by the fixing member and the movable member.

In an eyecup mounting mechanism according to a second aspect of the present invention, the movable member according to the first aspect may include a movable side engagement claw for sandwiching the mounting member and a pressure receiving portion that receives the pressing force of the elastic member, wherein the fixing member may include a fixing side engagement claw for sandwiching the mounting member, and wherein the movable side engagement claw and the fixing side engagement claw may face each other, and the movable side engagement claw may be pressed toward the fixing side engagement claw by the pressing force of the elastic member.

In an eyecup mounting mechanism according to a third aspect of the present invention, according to the second aspect, the movable side engagement claw may be provided inside the eyecup, and the pressure receiving portion may be provided outside the eyecup.

In an eyecup mounting mechanism according to a fourth aspect of the present invention, according to the second or third aspect, the mounting member provided in the camera body may have a mounting claw capable of being fitted between the movable side engagement claw and the fixing side engagement claw.

In an eyecup mounting mechanism according to a fifth aspect of the present invention, according to the second or third aspect, the movable side engagement claw and the fixing side engagement claw may be made of a hard resin.

In an eyecup mounting mechanism according to a sixth aspect of the present invention, according to any one of the second to fifth aspects, part of the mounting member may be configured to be fitted, by a linear movement, between the movable side engagement claw and the fixing side engagement claw.

In an eyecup mounting mechanism according to a seventh aspect of the present invention, according to any one of the second to fifth aspects, part of the mounting member may be configured to be rotatably fitted between the movable side engagement claw and the fixing side engagement claw.

In an eyecup mounting mechanism according to an eighth aspect of the present invention, according to any one of the first to fifth aspects, the eyecup may be configured to be removable from the camera body by a bayonet method.

In an eyecup mounting mechanism according to a ninth aspect of the present invention, according to any one of the first to eighth aspects, the elastic member may be formed integrally with the eye rubber.

In an eyecup mounting mechanism according to a tenth aspect of the present invention, according to any one of the first to ninth aspects, the eyecup mounting mechanism may further include a frame member that is formed integrally with the fixing member and that has a plurality of protrusions to engage the eye rubber.

An optical apparatus according to an eleventh aspect of the present invention includes the eyecup mounting mechanism according to any one of the first to tenth aspects.

First Embodiment

Hereinafter, the first embodiment according to an optical apparatus including the eyecup mounting mechanism of the present invention will be described with reference to the drawings. FIG. 1 is a perspective view showing the vicinity of a viewfinder 3 in a camera that is an optical apparatus of the first embodiment. In the camera shown in FIG. 1, a camera body 1 with a removable eyecup 2 removed and the eyecup 2 are shown. The eyecup 2 shown in FIG. 1 is configured to be mounted while being rotated with respect to the camera body 1, that is, to be mounted by a so-called bayonet method. Details of this mounting method will be described later.

Figure 3:
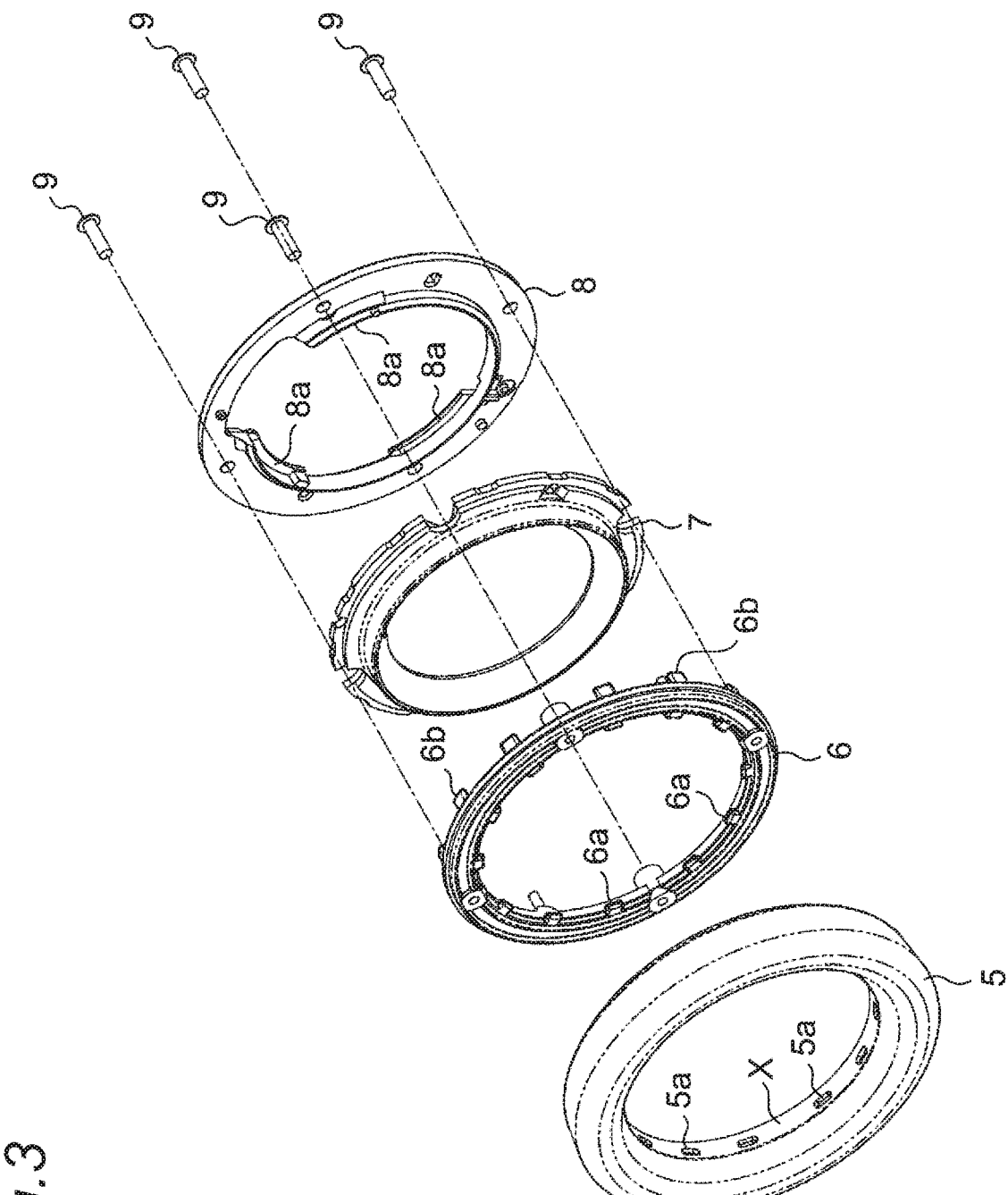
FIG. 3 is an exploded perspective view of the eyecup of the first embodiment (showing the eyepiece side of the eyecup).
Figure 4:
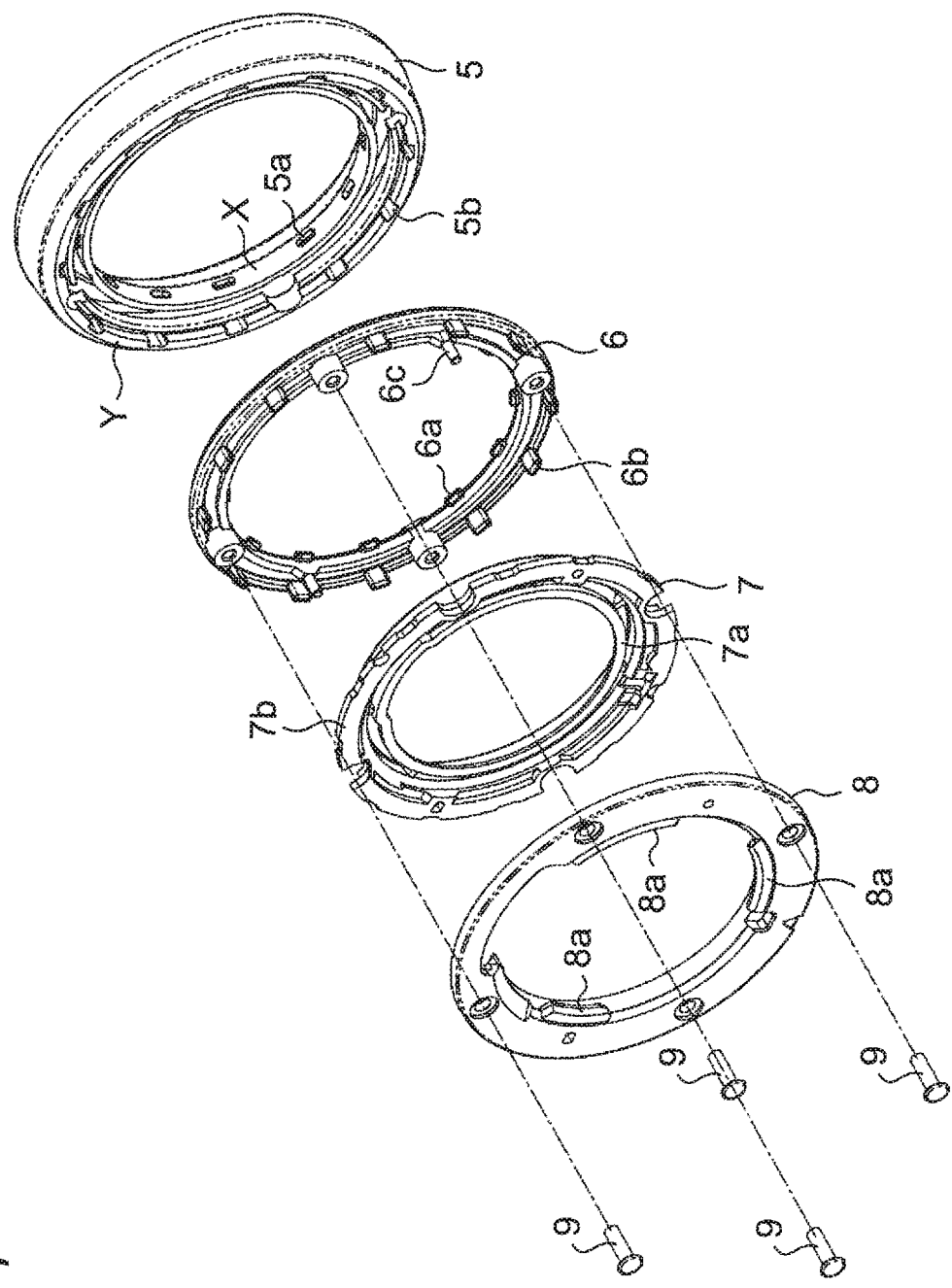
FIG. 4 is an exploded perspective view of the eyecup of the first embodiment (showing the lens side of the eyecup).

FIGS. 2A and 2B are perspective views of the eyecup 2. FIG. 2A is a view of the eyecup 2 as viewed mainly from the eyepiece side (the front side of the eyecup 2), and FIG. 2B is a view of the eyecup 2 as viewed mainly from the lens side (the back side of the eyecup 2). FIGS. 3 and 4 are exploded perspective views of the eyecup 2. FIG. 3 is an exploded perspective view of the eyecup 2 as viewed mainly from the eyepiece side, and FIG. 4 is an exploded perspective view of the eyecup 2 as viewed mainly from the lens side.

As shown in FIGS. 3 and 4, the eyecup 2 of the first embodiment includes an eye rubber 5, a frame member 6, a movable member 7, and a fixing member 8 from the eyepiece side. The frame member 6 and the fixing member 8 are fixed to each other by a connecting means, for example, a screw 9. The movable member 7 is disposed between the frame member 6 and the fixing member 8 and is held movably by the frame member 6 and the fixing member 8. The eye rubber 5 formed of a flexible rubber body, which is an elastic member, has a ring shape, and has a C-shaped hollow section. The eye rubber 5 is penetrated by and fixed to a plurality of protrusions (a first protrusion 6a, a second protrusion 6b) formed on the frame member 6. In the configuration of the first embodiment, the description will be made with a configuration in which the eye rubber 5 is penetrated by the protrusions (the first protrusion 6a and the second protrusion 6b) of the frame member 6. The protrusion (projection portion) of the frame member 6 may be engaged with and fixed to the recess formed in the eye rubber 5.

As shown in FIG. 3 and FIG. 4, the plurality of protrusions formed on the ring-shaped frame member 6 has the plurality of first protrusions 6a protruding inward from the inner peripheral face and the plurality of second protrusions 6b protruding toward the lens. As shown in FIG. 4, the frame member 6 is provided with a positioning pin 6c extending toward the lens. The positioning pin 6c is inserted into through holes formed at predetermined positions of the movable member 7 and the fixing member 8 and used for positioning.

Figure 5:
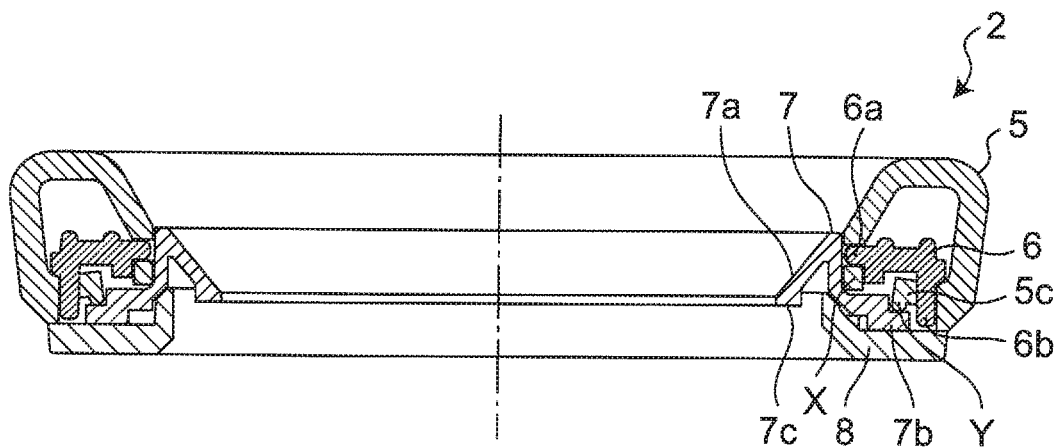
FIG. 5 is a cross-sectional view of the eyecup of the first embodiment.

FIG. 5 is a cross-sectional view of the eyecup 2 of the first embodiment, and is a cross-sectional view showing a state where the eye rubber 5 is penetrated by the first protrusion 6a and the second protrusion 6b of the frame member 6. As shown in FIG. 5, the first protrusion 6a is fitted into a first hole 5a formed in the inner peripheral edge X of the eye rubber 5, and the second protrusion 6b is fitted into a second hole 5b formed in the outer peripheral edge Y of the eye rubber 5. At this time, the ends of the inner peripheral edge X and the outer peripheral edge Y of the eye rubber 5 are disposed between the frame member 6 and the movable member 7, and press the movable member 7 against the fixing member 8. As a result, the movable member 7 is pressed by and fixed to the ends (elastic member) of the inner peripheral edge X and the outer peripheral edge Y of the eye rubber 5 between the frame member 6 and the fixing member 8.

The movable member 7 has a ring shape and is formed of a resin material. The movable member 7 includes a movable side engagement claw 7a formed on the inner periphery and a pressure receiving portion 7b formed on the outer periphery (see FIG. 5). The movable side engagement claw 7a of the movable member 7 has an inclined face that follows the inner peripheral face of the eyepiece region of the eye rubber 5, and the protruding end of the movable side engagement claw 7a defines the inner opening of the eyecup 2. Further, the lens side of the protruding end of the movable side engagement claw 7a is a sandwiching face 7c, which is a flat face facing the lens (a flat face directed downward in FIG. 5). As will be described later, the sandwiching face 7c is configured to engage with a mounting claw 4a (see FIG. 1) of the camera body 1.

The pressure receiving portion 7b formed on the outer periphery of the movable member 7 is, by the end (a pressing portion 5c) at the outer peripheral edge Y of the eye rubber 5, constantly pressed toward the lens so that the movable member 7 is pressed against the fixing member 8. For this reason, the movable member 7 movably disposed between the frame member 6 and the fixing member 8 is securely fixed and held at a predetermined position without rattling.

Figure 6:
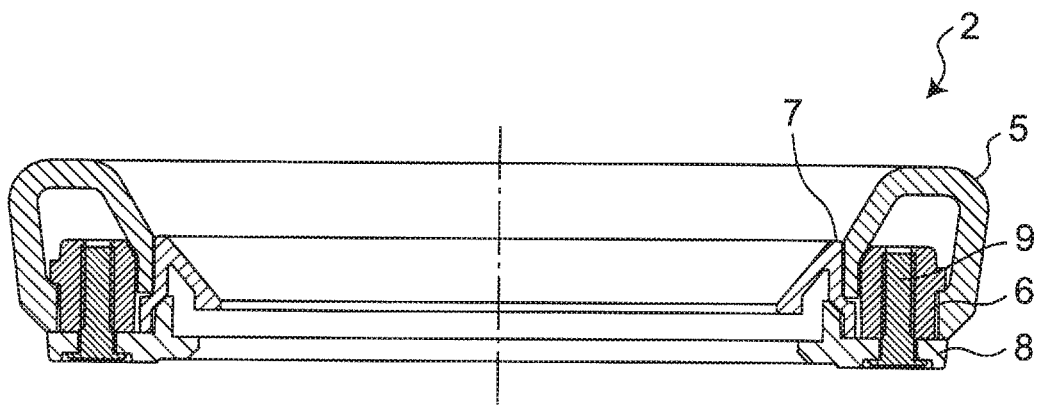
FIG. 6 is a cross-sectional view of the eyecup of the first embodiment.
Figure 7:
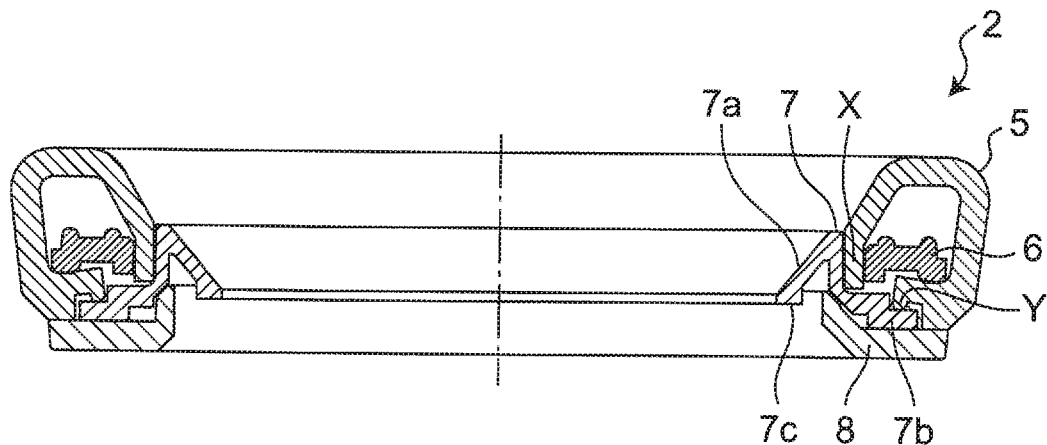
FIG. 7 is a cross-sectional view of the eyecup of the first embodiment.
Figure 8:
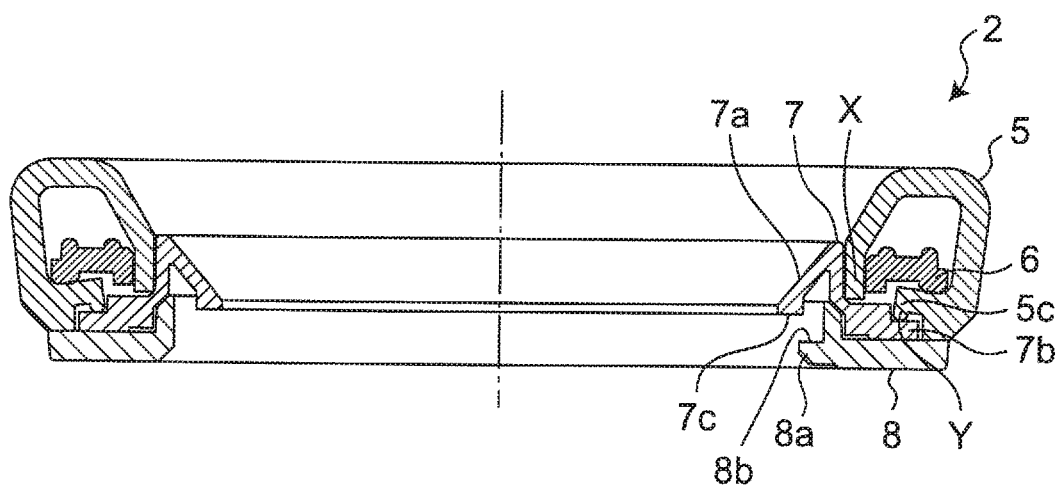
FIG. 8 is a cross-sectional view of the eyecup of the first embodiment.

FIGS. 6 to 8 are cross-sectional views of the eyecup 2 of the first embodiment, and are diagrams with different cutting positions. FIG. 6 is a cross-sectional view showing a region where the frame member 6 is fixed to the fixing member 8 by the screw 9 which is a connecting means. FIGS. 7 and 8 are cross-sectional views showing regions where the eye rubber 5 is not penetrated by the protrusions (the first protrusion 6a, the second protrusion 6b) of the frame member 6, and shows a state in which the pressing portion 5c, which is the end of the outer peripheral edge Y of the eye rubber 5, presses the pressure receiving portion 7b of the movable member 7 toward the lens (downward in FIGS. 7 and 8).

FIG. 8 is a cross-sectional view showing a region where the movable side engagement claw 7a of the movable member 7 and a fixing side engagement claw 8a of the fixing member 8 face each other so that the mounting claw 4a (see FIG. 1) of a mounting member 4 of the camera body 1 can be sandwiched. FIG. 7 is a cross-sectional view showing a region where the movable side engagement claw 7a of the movable member 7 does not face the fixing side engagement claw 8a of the fixing member 8. In this region, the mounting claw 4a of a mounting member 4 of the camera body 1 are inserted, the eyecup 2 is rotated, and the mounting claw 4a of the mounting member 4 is fitted to and sandwiched by the movable side engagement claw 7a of the movable member 7 and the fixing side engagement claw 8a of the fixing member 8.

Figure 9:
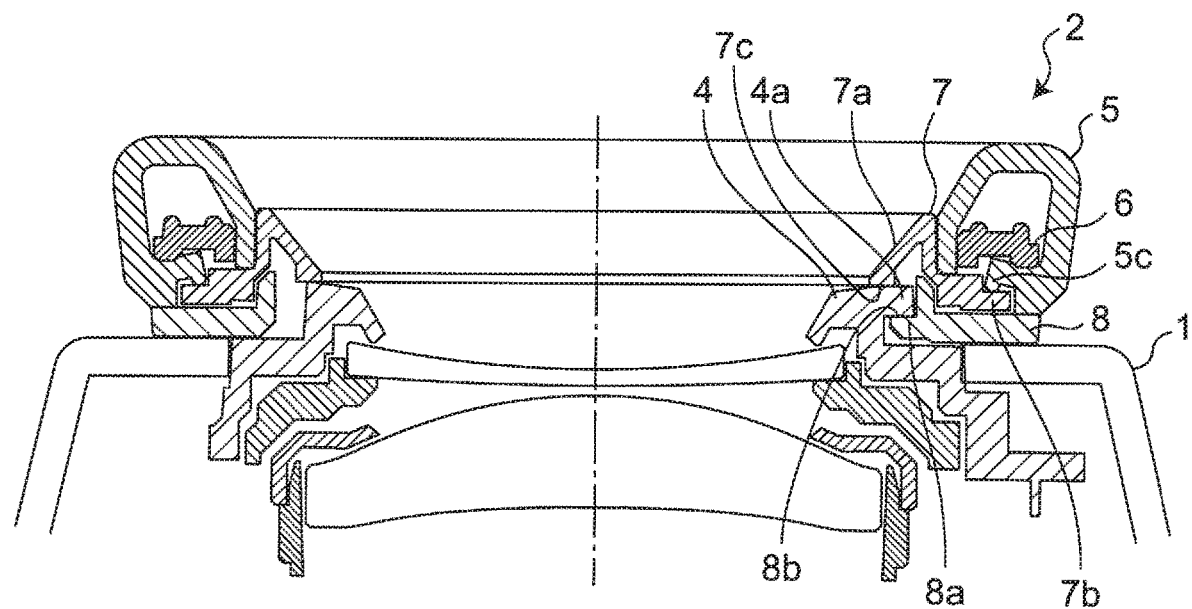
FIG. 9 is a cross-sectional view showing a state in which the eyecup of the first embodiment is mounted to the camera body.

FIG. 9 is a cross-sectional view showing a state in which the eyecup 2 is mounted to the mounting member 4 of the camera body 1. The camera body 1 to which the eyecup 2 is mounted is provided with a plurality of lenses for diopter adjustment. As shown in FIG. 9, the mounting claw 4a of the mounting member 4 provided in the camera body 1 is sandwiched by the movable side engagement claw 7a of the movable member 7 and the fixing side engagement claw 8a of the fixing member 8 in the eyecup 2, and the eyecup 2 is securely fixed to the camera body 1.

The method of mounting the eyecup 2 to the camera body 1 is such that the mounting claw 4a of the mounting member 4 in the camera body 1 is inserted in the region where the fixing side engagement claw 8a is not formed in the fixing member 8 of the eyecup 2, the eyecup 2 is rotated, and the mounting claw 4a of the mounting member 4 is fitted between the movable side engagement claw 7a of the movable member 7 and the fixing side engagement claw 8a of the fixing member 8 to be in a mounted state. The eyecup 2 is mounted to the camera body 1 by a so-called bayonet method.

As described above, the eyecup mounting mechanism of the first embodiment has a configuration in which the eyecup 2 is mounted on the mounting member 4 of the camera body 1 by the so-called bayonet method. As shown in FIG. 9, by rotating the eyecup 2, the mounting claw 4a of the mounting member 4 is fitted between the movable side engagement claw 7a of the movable member 7 and the fixing side engagement claw 8a of the fixing member 8, and the mounting claw 4a pushes up the movable side engagement claw 7a of the movable member 7. In the mounting operation at this time, the mounting claw 4a moves (slides) while being in contact with both the sandwiching face 7c of the movable side engagement claw 7a of the movable member 7 and a sandwiching face 8b of the fixing side engagement claw 8a of the fixing member 8. The mounting claw 4a at this time moves so as to lift the movable side engagement claw 7a of the movable member 7 against the pressing force (elastic force) of the outer peripheral edge Y of the eye rubber 5. For this reason, as shown in FIG. 9, when the eyecup 2 is mounted on the mounting member 4 of the camera body 1, the movable member 7 is lifted by the mounting claw 4a, the pressure receiving portion 7b of the movable member 7 is away from the fixing member 8, the mounting claw 4a of the mounting member 4 is sandwiched by the movable side engagement claw 7a of the movable member 7 and the fixing side engagement claw 8a of the fixing member 8 to be in the securely mounted state.

In the eyecup mounting mechanism of embodiment 1, the movable member 7 held movably between the frame member 6 and the fixing member 8 fixed to each other has the pressure receiving portion 7b that receives pressure in a direction to be pressed against the fixing member 8 by the outer peripheral edge Y (elastic member) of the eye rubber 5. The pressure receiving portion 7b of the movable member 7 is disposed between the outer peripheral edge Y of the eye rubber 5 and the fixing member 8, and is formed in the outer peripheral region of the movable member 7.

On the other hand, the movable side engagement claw 7a is formed in the inner peripheral region of the movable member 7. In the eyecup 2, the movable side engagement claw 7a is provided inward of the inner peripheral edge X of the eye rubber 5. Therefore, the movable member 7 is held at a desired position since the pressure receiving portion 7b in the outer peripheral region constantly receives a pressing force, and the movable side engagement claw 7a in the inner peripheral region cooperates with the fixing side engagement claw 8a of the fixing member 8 to sandwich the mounting claw 4a of the mounting member 4 of the camera body 1. The sandwiching force by the movable side engagement claw 7a of the movable member 7 and the fixing side engagement claw 8a of the fixing member 8 is determined by the pressing force (elastic force) by the outer peripheral edge Y of the eye rubber 5 received by the pressure receiving portion 7b of the movable member 7. This sandwiching force has a great influence on the mounting feeling felt by the user when the eyecup 2 is mounted to the camera body 1. That is, the mounting feeling is determined by the contact state (sliding state, friction state) between the mounting claw 4a of the mounting member 4, and the sandwiching face 7c of the movable side engagement claw 7a of the movable member 7 and the sandwiching face 8b of the fixing side engagement claw 8a of the fixing member 8. In the eyecup mounting mechanism of the first embodiment, the mounting claw 4a of the mounting member 4, the movable side engagement claw 7a of the movable member 7, and the fixing side engagement claw 8a of the fixing member 8 are made of hard resin so that the mounting claw 4a can move smoothly, and each contact face is formed smoothly.

The eyecup mounting mechanism of the first embodiment configured as described above has a smooth movement during the mounting operation of the eyecup 2, and has a secure and highly reliable mounting feeling without rattling in the mounted state. The eyecup mounting mechanism of the first embodiment has the sliding portion made of a material with high wear resistance, and has a configuration in which the change with time is suppressed even in long-term use, and a high-grade mounting state can constantly be maintained.

Second Embodiment

Next, an optical apparatus including the eyecup mounting mechanism of the second embodiment of the present invention will be described with reference to FIGS. 10 to 13. The optical apparatus including the eyecup mounting mechanism of the second embodiment will be described with a focus on differences from the optical apparatus of the first embodiment. In the description of the second embodiment, elements having the same operations and functions as those of the first embodiment described above may be denoted by the same reference numerals, and redundant description may be omitted.

Figure 10:
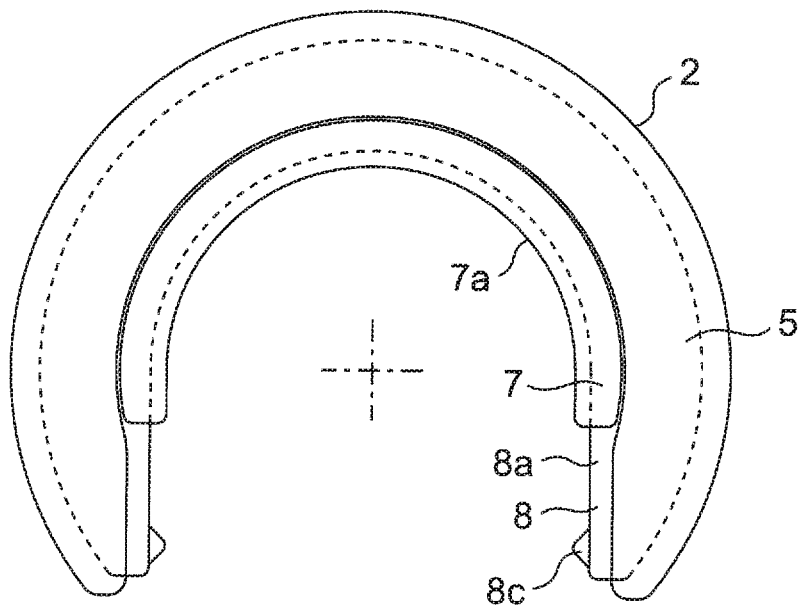
FIG. 10 is a diagram showing an eyecup of a second embodiment of the present invention (view on the eyepiece side).
Figure 11:
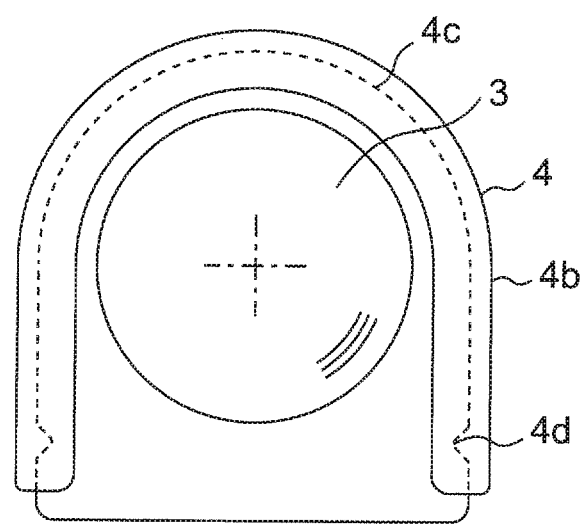
FIG. 11 is a diagram showing a mounting member provided on the camera body for mounting the eyecup of the second embodiment (view on the eyepiece side).

FIG. 10 is a diagram (eyepiece side view) showing the eyecup 2 of the second embodiment, and FIG. 11 is a diagram showing the mounting member 4 provided on the camera body 1 for mounting the eyecup 2 (eyepiece side). In FIG. 11, only the mounting member (including the viewfinder) is shown, and the camera body 1 is omitted. The bayonet method of rotating and mounting the eyecup 2 is used in the first embodiment. The eyecup 2 of the second embodiment moves linearly (linear movement) with respect to the mounting member 4 of the camera body 1. In the configuration of the second embodiment, the eyecup 2 is moved up and down with respect to the mounting member 4 to be removed.

The eyecup 2 of the second embodiment includes the eye rubber 5, the frame member 6 (see FIG. 13), the movable member 7, and the fixing member 8, as in the eyecup 2 of the first embodiment. As shown in FIG. 10, the eyecup 2 of the second embodiment has an inverted U shape with the lower part open, and the inverted U-shaped eye rubber 5 is fixed to the inverted U-shaped fixing member 8. As in the fixing of the first embodiment, as a method of fixing the eye rubber 5 to the fixing member 8, the eye rubber 5 may be penetrated by and fixed to the protrusion of the frame member 6 fixed to the fixing member 8 (the first protrusion 6a, the second protrusion 6b: see FIGS. 3 and 4), or may be fixed by the engagement by a protrusion and a recess.

As in the eyecup mounting mechanism of the first embodiment, in the eyecup mounting mechanism of the second embodiment, the movable member 7 is disposed between the frame member 6 and the fixing member 8, and is held movably by the frame member 6 and the fixing member 8. Further, the outer peripheral edge (elastic member) Y of the eye rubber 5 is disposed between the frame member 6 and the movable member 7, and presses the movable member 7 against the fixing member 8. As a result, the movable member 7 is pressed, between the frame member 6 and the fixing member 8, by the outer peripheral edge Y of the eye rubber 5 and is securely fixed.

In the eyecup mounting mechanism of the second embodiment, the mounting member 4 has a mounting edge 4b having a predetermined thickness above the outer peripheral portion thereof (see FIG. 11). The mounting edge 4b is sandwiched by the movable side engagement claw 7a of the movable member 7 and the fixing side engagement claw 8a of the fixing member 8. The movable member 7 has an inverted U shape with the lower part opened, and the movable member 7 is fitted into a fitting portion 4c having the inverted U shape of the mounting member 4. At this time, an engagement protrusion 8c formed on the fixing member 8 is engaged with an engagement recess 4d formed on the fitting portion 4c of the mounting member 4, and the mounting of the eyecup 2 to the camera body 1 is completed.

In the eyecup mounting mechanism of the second embodiment, the described is made with an example in which the engagement protrusion 8c protruding inward of the fixing member 8 is formed, and the engagement recess 4d is formed on the outer periphery of the fitting portion 4c. The present invention is not limited to such a configuration, but any configuration may be used as long as the fixing member 8 and the fitting portion 4c are securely engaged to complete the mounting of the eyecup 2 to the camera body 1. In the eyecup mounting mechanism of the second embodiment, as in the first embodiment, the mounting claw 4a of the mounting member 4, the movable side engagement claw 7a of the movable member 7, and the fixing side engagement claw 8a of the fixing member 8 are made of hard resin so as to move smoothly, and each contact face is formed smoothly.

Figure 12:
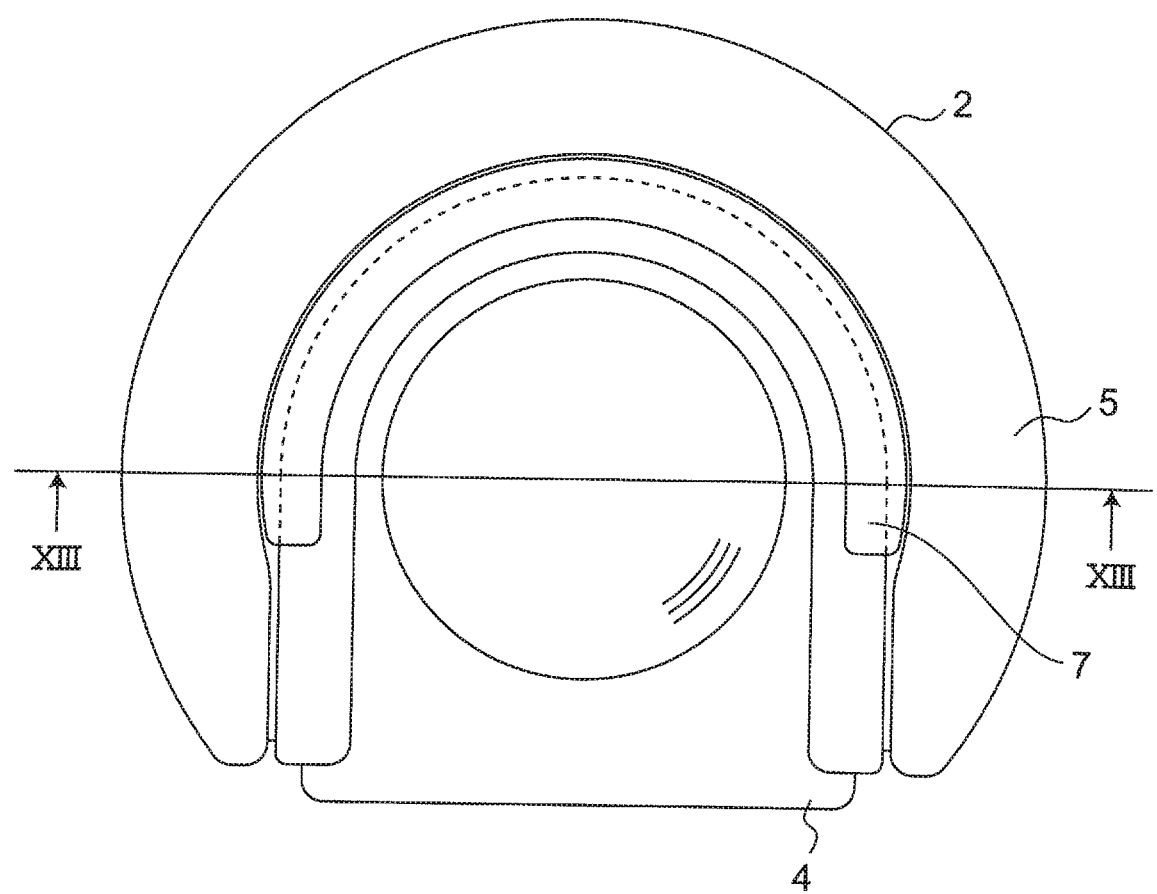
FIG. 12 is a diagram showing a state where the eyecup of the second embodiment is mounted to the camera body (view on the eyepiece side).
Figure 13:
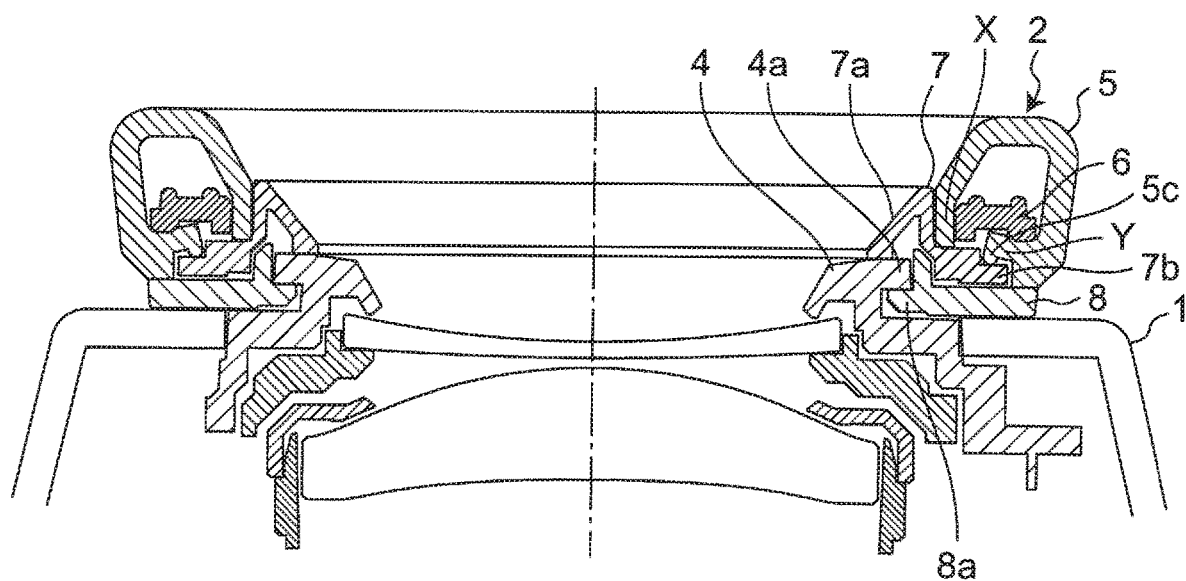
FIG. 13 is a cross-sectional view of the eyecup mounted to the camera body shown in FIG. 12 taken along line XIII-XIII.

FIG. 12 is a diagram (eyepiece side view) showing a state in which the eyecup 2 of the second embodiment is mounted on the mounting member 4 of the camera body 1. FIG. 13 is a cross-sectional view of the eyecup 2 mounted to the camera body 1 shown in FIG. 12 taken along line XIII-XIII.

The upper half of the movable member 7 of the second embodiment has a substantially arc shape and is made of a resin material. The movable member 7 includes the movable side engagement claw 7a formed so as to protrude toward the inner periphery, and the pressure receiving portion 7b formed on the outer periphery. As shown in FIG. 13, the movable side engagement claw 7a of the movable member 7 has an inclined face that follows the inner peripheral face of the eyepiece region of the eye rubber 5, and the protruding end of the movable side engagement claw 7a defines the inner opening of the eyecup 2. Further, the protruding end (the sandwiching face 7c) of the movable side engagement claw 7a has a flat face directed to the lens, and is engaged with the mounting claw 4a (see FIG. 13) of the mounting member 4 of the camera body 1.

The eyecup 2 of the second embodiment is configured such that the mounting claw 4a of the mounting member 4 of the camera body 1 is moved linearly downward (linear movement) in a state in which it is sandwiched by the movable side engagement claw 7a of the movable member 7 and the fixing side engagement claw 8a of the fixing member 8, and the eyecup 2 is mounted to the camera body 1. As shown in FIG. 13, in a state in which the eyecup 2 is mounted to the camera body 1, the mounting claw 4a of the mounting member 4 of the camera body 1 is sandwiched by the movable side engagement claw 7a of the movable member 7 and the fixing side engagement claw 8a of the fixing member 8, and as described above, the engagement protrusion 8c of the fixing member 8 is engaged with the engagement recess 4d of the fitting portion 4c of the mounting member 4 to securely fix and mount the eyecup 2 to the camera body 1.

The eyecup mounting mechanism of the second embodiment configured as described above has a smooth movement during the mounting operation of the eyecup 2, and has a secure and highly reliable excellent mounting feeling without rattling in the mounted state. The eyecup mounting mechanism of the second embodiment has the sliding portion made of a material with high wear resistance, and has a configuration in which the change with time is suppressed even in long-term use, and a high-grade mounting state can constantly be maintained.

In the eyecup mounting mechanism of the first embodiment and the second embodiment, the description is made with a configuration in which the outer peripheral edge Y of the eye rubber 5 presses the pressure receiving portion 7b of the movable member 7, but the present invention is not limited to such a configuration. For example, the pressure receiving portion 7b of the movable member 7 may be pressed by an elastic member independent of the eye rubber. In the eyecup mounting mechanism of the present invention, the movable member held movably by the fixing member together with the fixing member at the inner periphery thereof slides and sandwiches part of the mounting member of the camera body, and is fixed to the fixing member by the pressing force of the elastic member at the outer periphery thereof. For this reason, in the eyecup mounting mechanism of the present invention, the mounting operation at the time of mounting can be facilitated, a reliable mounting state can be achieved without rattling, and the optical apparatus having high reliability and high quality can be provided.

In the eyecup mounting mechanism of the first embodiment and the second embodiment, the description is made with a configuration in which the frame member 6 is fixed to the fixing member 8 with screws, but the present invention is not limited to such a configuration. The frame member 6 may be fixed to the fixing member 8 by heat welding or the frame member 6 may be configured integrally with the fixing member 8 so that the fixing member 8 includes the frame member 6.

As described above, the eyecup mounting mechanism of the present invention can be configured to be easily mounted on the optical apparatus, has a smooth mounting operation, and to suppress a change with time even in long-term use. In addition, the eyecup mounting mechanism of the present invention can provide a highly reliable optical apparatus that can securely maintain a high-quality mounting state. Therefore, the optical apparatus provided with the eyecup mounting mechanism of the present invention is a highly reliable, high-quality and excellent precision machine.

Although the present invention has been described in each embodiment with a certain degree of detail, the disclosure of these embodiments should vary in the details of the configuration, and substitutions, combinations, and changes in the order of elements in each embodiment can be realized without departing from the scope and spirit of the claimed invention.

INDUSTRIAL APPLICABILITY

The eyecup mounting mechanism according to the present invention is a highly versatile mechanism that is used for an eyepiece portion in various optical machines to increase the reliability of the optical machines.

REFERENCE SIGNS LIST 1 camera body
2 eyecup
3 viewfinder
4 mounting member
4a mounting claw
5 eye rubber
5a first hole
5b second hole
5c pressing portion
6 frame member
6a first protrusion
6b second protrusion
6c positioning pin
7 movable member
7a movable side engagement claw
7b pressure receiving portion
7c sandwiching face
8 fixing member
8a fixing side engagement claw
8b sandwiching face
9 screw
X inner peripheral edge
Y outer peripheral edge

The invention claimed is:
1. An eyecup mounting mechanism for mounting a removable eyecup to a camera body,
   wherein the eyecup includes
      an eye rubber,
      a fixing member that holds the eye rubber in a predetermined position,
      a movable member held movably by the fixing member, and
      an elastic member that presses the movable member against the fixing member to fix the movable member to the fixing member, and
   wherein a mounting member provided in the camera body is fitted between the fixing member and the movable member against a pressing force of the elastic member, and the mounting member is sandwiched by the fixing member and the movable member.

2. The eyecup mounting mechanism according to claim 1, wherein the movable member includes a movable side engagement claw for sandwiching the mounting member and a pressure receiving portion that receives the pressing force of the elastic member,
wherein the fixing member includes a fixing side engagement claw for sandwiching the mounting member, and
wherein the movable side engagement claw and the fixing side engagement claw face each other, and the movable side engagement claw is pressed toward the fixing side engagement claw by the pressing force of the elastic member.

3. The eyecup mounting mechanism according to claim 2, wherein the movable side engagement claw is provided inside the eyecup, and the pressure receiving portion is provided outside the movable side engagement claw.

4. The eyecup mounting mechanism according to claim 2, wherein the mounting member provided in the camera body has a mounting claw capable of being fitted between the movable side engagement claw and the fixing side engagement claw.

5. The eyecup mounting mechanism according to claim 2, wherein the movable side engagement claw and the fixing side engagement claw are made of a hard resin.

6. The eyecup mounting mechanism according to claim 2, wherein part of the mounting member is configured to be fitted, by a linear movement, between the movable side engagement claw and the fixing side engagement claw.

7. The eyecup mounting mechanism according to claim 2, wherein part of the mounting member is configured to be rotatably fitted between the movable side engagement claw and the fixing side engagement claw.

8. The eyecup mounting mechanism according to claim 1, wherein the eyecup is configured to be removable from the camera body by a bayonet method.

9. The eyecup mounting mechanism according to claim 1, wherein the elastic member is formed integrally with the eye rubber.

10. The eyecup mounting mechanism according to claim 1, further comprising a frame member that is formed integrally with the fixing member and that has a plurality of protrusions to engage the eye rubber.

11. An optical apparatus comprising the eyecup mounting mechanism according to claim 1.

\* \* \* \* \*